United States Patent [19]
Jimerson et al.

[11] 3,745,673
[45] July 17, 1973

[54] EDUCATIONAL GAME TOY

[76] Inventors: Bruce D. Jimerson; Bonna J. Jimerson, both of 1815 Vallecito Dr., San Pedro, Calif. 90732

[22] Filed: July 6, 1971

[21] Appl. No.: 159,612

[52] U.S. Cl. .................................................. 35/9 A
[51] Int. Cl. ............................................. G09b 3/06
[58] Field of Search ................... 35/9 A, 9 B, 31 A, 35/35 D, 35 F, 35 R, 35 A

[56] References Cited
UNITED STATES PATENTS

| | | | |
|---|---|---|---|
| 2,092,577 | 9/1937 | Hornung | 35/9 B |
| 3,515,373 | 4/1967 | Diamond | 35/9 A |
| 3,590,498 | 7/1971 | Landzerg | 35/9 A |
| 3,538,620 | 11/1970 | Kohner et al. | 35/8 R |
| 3,538,621 | 11/1970 | Mayeda | 35/9 A |
| 3,577,656 | 5/1971 | Lyon | 35/9 A |
| 3,612,527 | 10/1971 | Rogerson | 35/22 R X |
| 2,970,387 | 2/1961 | Dean | 35/9 A |
| 3,571,951 | 3/1971 | Siegel et al. | 35/35 R |
| 3,258,857 | 7/1966 | Behn | 35/35 A X |

*Primary Examiner*—Wm. H. Grieb

[57] ABSTRACT

The simultaneous stimulation of different physical senses has been recognized by educators as an efficient method for teaching young children. This technique can be the bases of an entertaining mechanical game-toy which utilizes a coded rotatable wheel to provide various incentives and rewards which encourage the correct response to questions presented on interchangeable game discs encoded with visual, textural, imbrailled, and accoustical information.

8 Claims, 27 Drawing Figures

INVENTORS
BRUCE D. JIMERSON
BONNA J. JIMERSON

INVENTORS
BRUCE D. JIMERSON
BONNA J. JIMERSON

Fig. 4

PATENTED JUL 17 1973

INVENTORS
BRUCE D. JIMERSON
BONNA J. JIMERSON

INVENTORS
BRUCE D. JIMERSON
BONNA J. JIMERSON

INVENTORS.
BRUCE D. JIMERSON
BONNA J. JIMERSON

EDUCATIONAL GAME TOY

BACKGROUND OF THE INVENTION:

In recent years game and toy manufacturers have put increasing emphasis upon learning devices. Most of the commercial products presently available are inefficient in that the apparatus is typically some sort of card reading machine wherein different cards (each having a separate question coded thereon) are inserted for each question and answer. In addition, the method of rewarding a correct answer is usually somewhat unimaginative, e.g., a key that can be inserted into the correct answer hole to withdraw the card - or simply displaying the correct answer after the child has thought about the question. Electronic devices such as buzzers (to indicate a correct answer) have also been used on the more sophisticated teaching devices made for older children - but because of the cost of such devices and the probable rough treatment which they may be subjected to, these are generally impractical for the pre-school child. Another factor which most commercial teaching devices lack is the game-e-ness. Good games should have surprise, suspense, and expectation. What is actually desired is a simple inexpensive teaching toy which makes it fun to learn. Accordingly it is a primary object of the present invention to provide an entertaining educational apparatus.

It is another object of the invention to provide a 3-dimensional game for children.

It is further an object of the invention to provide an apparatus for developing a child's sense of touch and feel.

It is another object of the invention to provide an apparatus which will aid in developing a child's reading concentration.

It is another object of the invention to provide a learning toy in which different sets of problems may be quickly substituted for one another.

It is another object of the invention to provide a competitive game-toy.

Other objects and advantages of the present invention will become obvious from the detailed description of a preferred embodiment given herein below.

SUMMARY OF THE INVENTION:

The invention comprises a rotatable wheel which is keyed to provide rewards and/or advancement to the next question when the correct answer to a question is found. In one embodiment, the reward mechanism comprises candy, coins, or other objects stored beneath different trap doors. The trap doors are actuated by a push rod which has one end juxtapositioned to the rotatable wheel, the wheel having a plurality of holes (or openings) through which the push rods pass provided the wheel is properly positioned. Question discs are indexed with respect to the wheel so that several wrong answers and one correct answer to each question is visible through answer windows adjacent to the trap doors. The openings in the wheel are arranged so that one and only one trap door (the one corresponding to the correct answer) will open each time the wheel is registered on a question. The question wheels may present simple arithmetic problems, or they could display various objects such as a cat, with the answers "CAT," "DOG," "FOX," "GRAPE," appearing for example, in the answer windows so that the child is taught to identify the letters "CAT" with the picture of the cat showing in the question box. The device may also be used with texture wheels which teach the child to identify a particular feeling with an appearance, e.g., sandpaper, felt, burlap, plastic, etc. Embossed or brailled letters can also be used to teach spelling and other skills, the theory being that knowledge gained through the use of more than one physical sense is retained longer than information received by a single sense such as visual observation only. Other embodiments include a reward system based upon racing to the finish line against an opponent — or a solitaire game to beat an imaginary opponent. In this form of the device the wheel is spring wound so that it will slowly rotate from one question to another, when it is released by actuating a push rod adjacent to the answer window showing the correct answer. Each time the wheel rotates, one or the other of two possible racing figures (e.g., horses, cars, etc.) is advanced depending upon which child actuates the correct push rod. The winner of the race is the winner of the game. In this embodiment the board can be made to depict a Fairground raceway — and the wheel can be powered by a small music box movement (e.g., the Sankyo Corp. Model No. 23N-S). The music box provides audio reward with 4 or 5 seconds of some appropriate tune like "Camptown Races" as the wheel (and consequently the racing figure) advances to the next question.

Another embodiment of the invention depicts a "Treasure Island" having numerous window locations some of which display answers to a question which appears in a visual window or in a cave. Each window is connected by trails and paths and each player (under the rules of the game), is allowed to move his peg type game piece from one position (a hole associated with the answer window) to any connected position. When the player pushes his pegged game piece into the hole adjacent to the window displaying the correct answer, the wheel is released. The game discs are coded so that some of the answer windows display ominous figures such as a pirate, headhunter, and a tiger. If the other player is at a window when one of these figures appears he loses the game (or a certain number of tokens). The gams discs are coded so that these ominous figures will not appear at that window where the correct answer is displayed, i.e., the player who occupies the correct position (and who releases the wheel) is safe during the next fractional revolution of the wheel.

Each of the embodiments is constructed so that the game discs can be easily changed to teach different lessons and subject matter. The same structure may be used for arithmetic, reading, texture, spelling and identifying musical scores, etc. In addition to the physical rewards such as prizes or winning the race or avoiding getting caught by the tiger, pirate, etc., the apparatus can include sonic rewards such as a bell. A primary advantage of this type of reward (over a light or buzzer) lies in the fact that the entire apparatus is mechanical - no batteries or electricity is required.

DESCRIPTIONS OF PREFERRED EBODIMENTS

Adverting to the drawings, and particularly FIG. 1, a preferred embodiment of the invention comprises a base 4 having support spacers 5–8 at each corner, a cover 2 attached to said supports 5–8; an access plate 3 hinged to said cover 2 and a rotatable wheel 1 having a plurality of slot shaped openings 10–15 arranged in a manner to be described below to correspond with the location of the trap door push rods so that one and only one trap door will open for each rotational position of the wheel. The cover 2 has a circular opening of size sufficient to accommodate the various game discs, a rectangular trap door opening 20–23 at each corner, and a square opening 29 which is normally covered by the flap 30 of the access plate 3. The rectangular openings 20–23 have oppositely disposed recessed indentations 31 and 32 to accommodate accordant protrusions 33 and 34 on the trap doors — the function of the protrusions 33–34, and indentations 31–32 being to provide bearing points about which the trap door 25 may rotate.

The trap door assembly comprises a trap door 25 having a slot 28, an upper guide plate 26, a flanged push rod 27 and a lower guide plate 38. There are four such assemblies (one associated with each of the openings 20–23) in the preferred embodiment shown in FIG. 1. When assembled as indicated, the top of the push rod 27 extends upwardly through the hole 35 in the guide cover plate 26 and the bottom of the push rod 27 extends slightly beyond the hole 39 in the bottom guide plate 38. The flange 90 on the push rod 27 rests in contact with the trap door 25 at the rear of the slot 28. The push rod 27 is square to prevent it from rotating with respect to the slot 28.

The wheel 1 has a hole 45 at its center of a size sufficient to accommodate the bearing post 44 in the center of the base 4. A portion of the wheel near the outer periphery is formed to create a ring of separate trays 46 — the trays being located on a radius such that they pass beneath the openings 20–23 when the wheel 1 is rotated about the bearing 44. When one of the trap doors 25 is opened, the contents of one of the trays 46 will be accessible. The trays are also accessible through the opening 29 so that they can be loaded with various goodies when the cover plate 3 is lifted. The opening 29 is located on the same radius (with respect to the bearing post 44) as the openings 20–23. The width of the base 4 should be slightly smaller than the diameter of the wheel 1 so that the rim of the wheel 1 will extend beyond the edges 50 and 51 of base 4. The cover 2 is adapted to have a registration hole 55 — the registration pin 54 being spring loaded to drop into accordant registration holes 56 near the outer periphery of the wheel 1 so that the wheel can be stopped and retained stationary with the trays 46 on the wheel 1 properly aligned directly below the trap door openings 20—23.

The hinged access plate 3 has 5 windows 60—64. Windows 61 and 62 are located on the largest radius with respect to the bearing 44. Windows 63 and 64 are located on a slightly smaller radius, and window 60 is located on a slightly smaller radius than windows 63 and 64. Window 60 is the "Question Window" and windows 61–64 are answer windows. Window 62 is proximate to trap door opening 21, window 61 is proximate to trap door opening 22, window 63 is proximate to trap door opening 23, and window 64 is proximate to trap door opening 20. Pins 70 and 71 on the wheel serve to properly position the various game discs with respect to the wheel 1. When so positioned, one of the four answers which appears in the windows 61–64 will be the correct answer to the question showing in window 60. The slots 10–15 are positioned so that one (and only one) will be aligned under a push rod 27, i.e., the push rod which opens the trap door is closest to the window in which the correct answer appears.

Figure 2A:
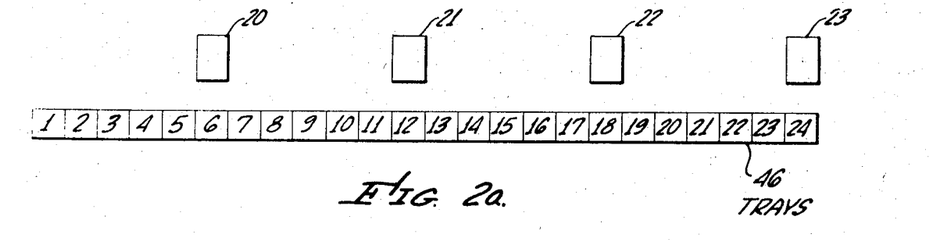
FIGS. 2a – 2g illustrate a linear extrapolation of a sequence by which the wheel can be encoded with slots so that one and only one trap door will open for each position of the wheel.
Figure 2B:
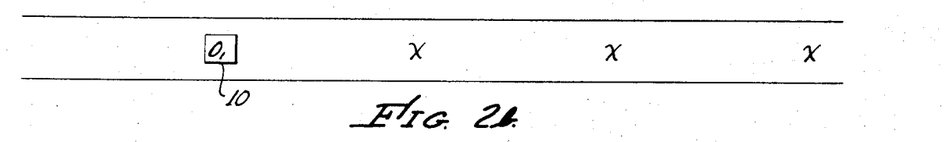
Figure 2C:
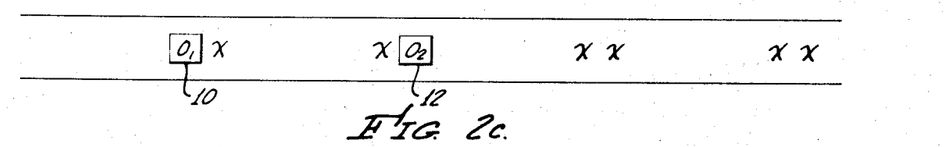
Figure 2D:
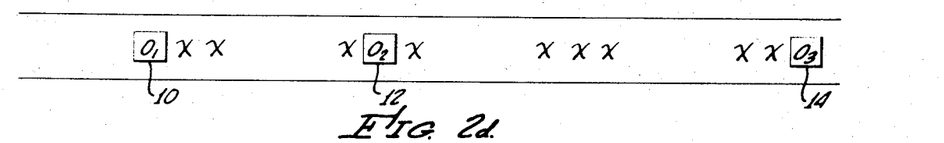
Figure 2E:
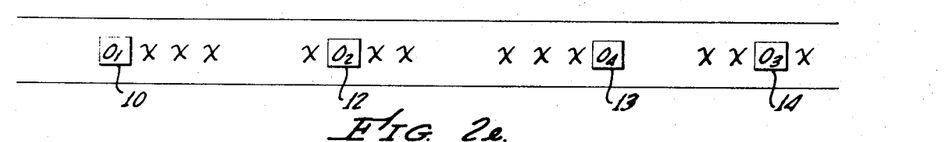
Figure 2F:
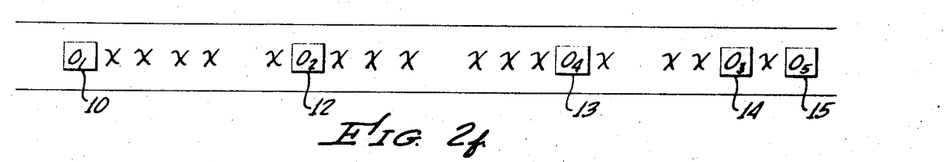
Figure 2G:
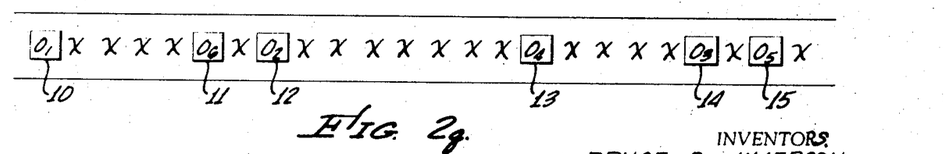

The slots 10–15 in the wheel must be located so that only one trap door will open for each registration of the pin 54 in a hole 56. assume for example, that the wheel has 24 trays and further, that the openings 20–23 are equally spaced about the same radius (i.e., each 90° apart). The proper location of the slots 10–15 can be determined by first positioning the wheel so that a tray is under each trap door as shown by the linear extrapolation of FIG. 2a. If one trap door (e.g., 20) is selected to open at this position of the wheel, a slot 10 near the outer perimeter should be cut adjacent to tray 6. There should be no slots adjacent to trays 12, 18 and 24. This situation is depicted in FIG. 2b which shows the prohibited positions marked with "X's." If the wheel 1 is then moved to the next registration position and a different trap door selected as the one which will open, the same procedure can be repeated. For example, if the trap door covering opening 21 is selected to open next, a slot 12 in the perimeter can be cut as shown in FIG. 2c. Similarly, if the trap door covering 23 is selected for the third position, and trap door covering 22 is selected for the fourth position, and the trap door covering 23 is selected for the fifth position, and the trap door covering 20 is selected for the sixth position, the periphery of the wheel 1 can be progressively slotted as indicated in FIGS. 2d – 2g.

Figure 3:
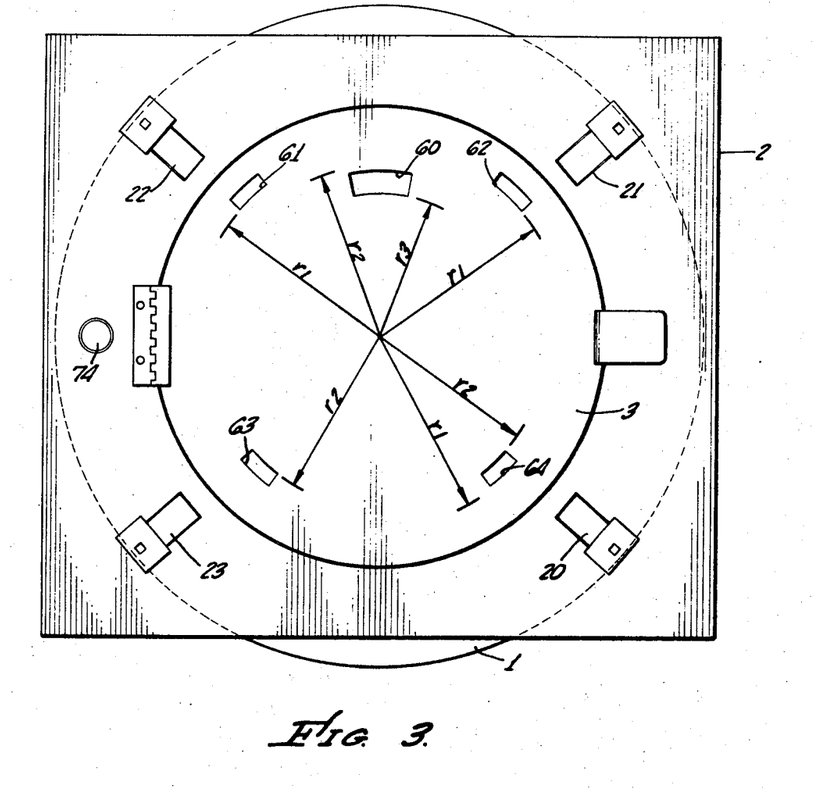
FIG. 3 illustrates the positional relationship of the question and answer windows relative to the trap doors.

FIG. 3 shows the relationship of the openings 20–23 to the windows 61–64 in the hinged access plate 3. It will be seen that the answer windows are angularly displaced with respect to the location of the openings 20–23 so that a slot (for example 10) which allows one trap door (e.g., that one covering 22), to open at one position of the wheel, will not also be in a position to allow the other trap door on that radius to open (i.e., the one covering 21) when the same answer appears in the window 62.

Figure 4:
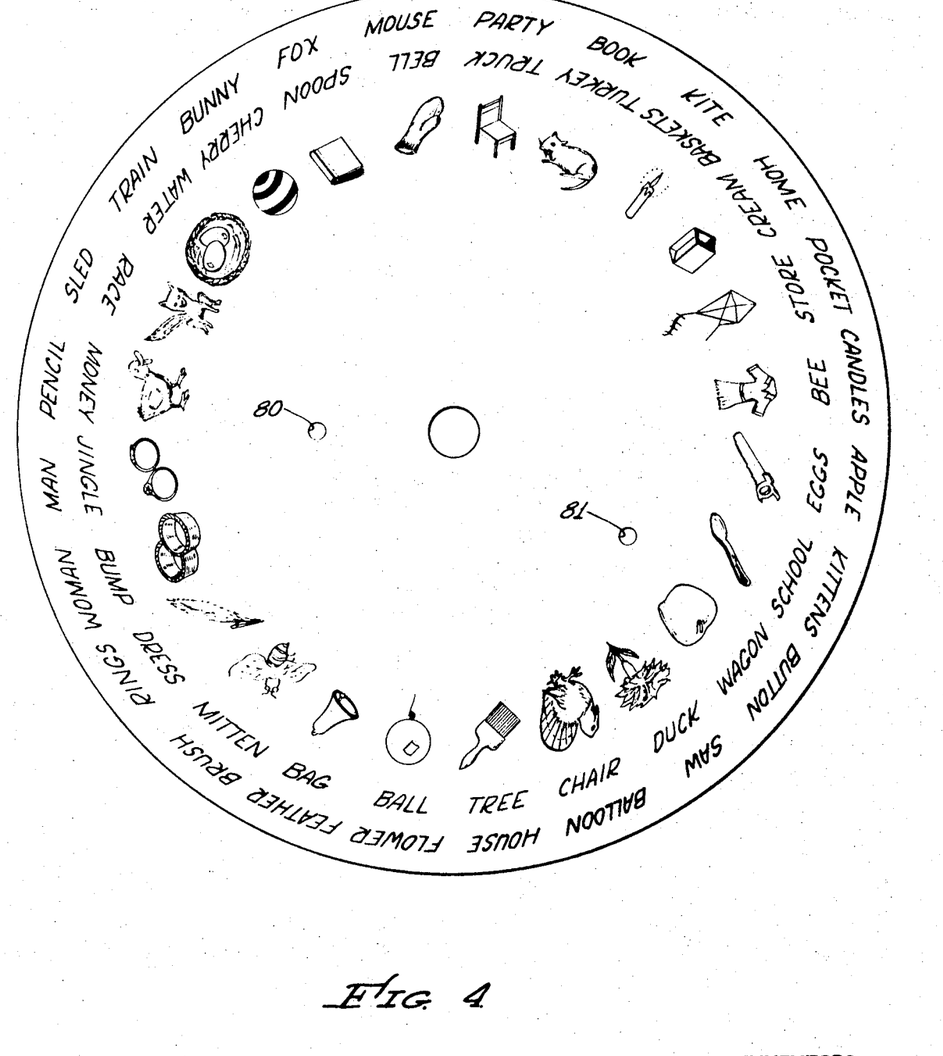
FIG. 4 shows a typical game disc which could be used with the apparatus shown in FIG. 1.

FIG. 4 shows a typical game disc which might be used. It will be seen that one band of answers is inverted with respect to the question so that they will appear right side up when viewed through the windows 63 and 64. The discs have indexing holes 80 and 81 and are typically printed cardboard — either colored or black and white. If they are printed on both sides, each disc will comprise a 48 question lesson. The lessons may be simple word identification (e.g., the answer windows 61–64 may show the words "CAT," "HOUSE," "MOUSE," "BOOK" and a picture of a book may appear in the question window. The child can get a reward by depressing the push rod on the trap door nearest the window where the word "BOOK" appears. If the child attempts to depress the wrong push rod, nothing happens since the push rod will be blocked by the wheel 1 unless one of the slots 10–15 is directly below the push rod. The questions and answers on the game discs must of course, be laid out so that the correct answer to a question appearing in the window 60 will show through the answer window which is adjacent to that trap door which can be opened by virtue of the position of one of the slots 10–15.

Because of the more or less haphazard way in which the slot sequence was chosen (FIG. 2), the children cannot anticipate which trap door will open next. Each new position of the disc will thus present a new question and a new answer. Since the reward trays 46 under the trap doors also change when the wheel is moved, there is anticipation as to what the reward will be and surprise when the correct answer is found.

The trays 46 can be loaded by parents, or by the children themselves (through the opening 29). The game can be played in a solitaire fashion — or it can be played competitively between two or more children — with the children taking turns moving the wheel and finding the answers. The wheel may be rotated from one position to another (to change the question) by simply lifting knob 74 so that the pin 54 does not fall into one of the holes 56. Small candy rewards can be used — or the trays may be stocked with different colored steel coins. The children can use a small magnet on the end of a stick to withdraw the steel coins, with the first child to acquire a certain number being declared the winner. Each tray should have several identical rewards — with the rules allowing a child to remove only one of the rewards during a turn so that something will be left in the event the same tray is accessed more than once during a game.

Figure 5:
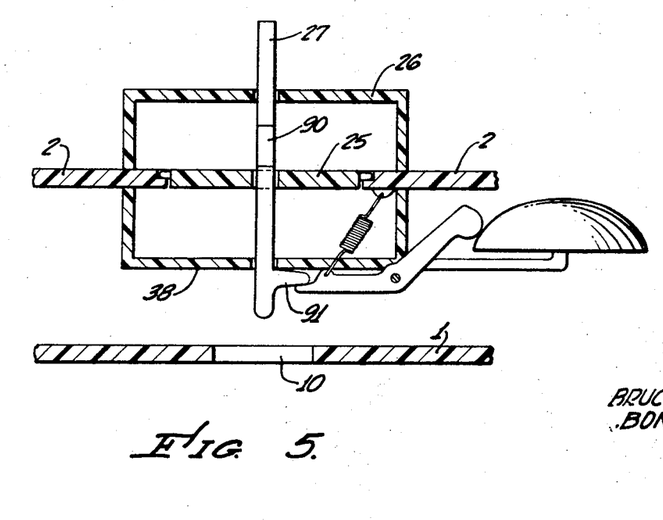
FIG. 5 shows an arrangement for producing an audio reward when the correct push button is depressed.
Figure 6:
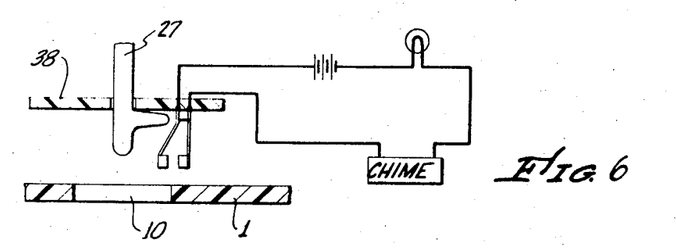
FIG. 6 shows a battery operated reward mechanism.
Figure 7:
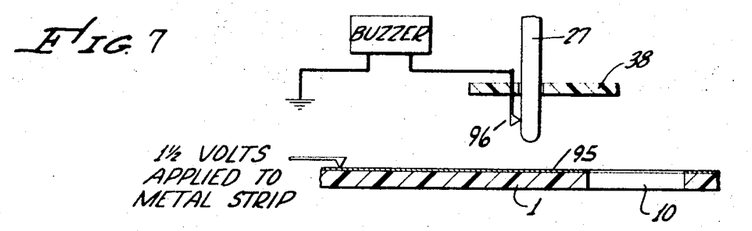
FIG. 7 shows an anti-reward system.

The basic assembly can also include a device for mechanically ringing a bell when the correct tray door push rod is depressed. Such an apparatus is shown in FIG. 5. In some embodiments, it may be desirable to eliminate the trap door rewards entirely and utilize the bell only. In other cases, lights and buzzers could be added so that one might have the option of operating the device with a battery or without a battery as previously described. Thus in FIG. 6, a correct answer not only opens the trap door — but it would also turn on a light — or make a sound. In FIG. 7 an attempt to depress the wrong push rod would actuate a contact 95 and 96 to sound a wrong answer buzzer. The systems shown in FIGS. 6 and 7 can be used together — or either may be used by itself.

In order to change the game discs, the child simply lifts the hinged access plate 3, removes the old disc — puts on a new one (or turns the previous one over to play the game on the opposite side) by aligning the holes 80 and 81 on the pins 70 and 71. The reward trays for the new game can also be loaded (through opening 29) while the access plate 3 is open.

It is contemplated that the device will be sold with 2 or 3 game discs — together with a catalog listing other discs — each having its own special lesson. These could be available through mail order. Listed below is a sample of the various games and lessons which lend themselves to this type of learning machine.

Figures 8A, 8B:
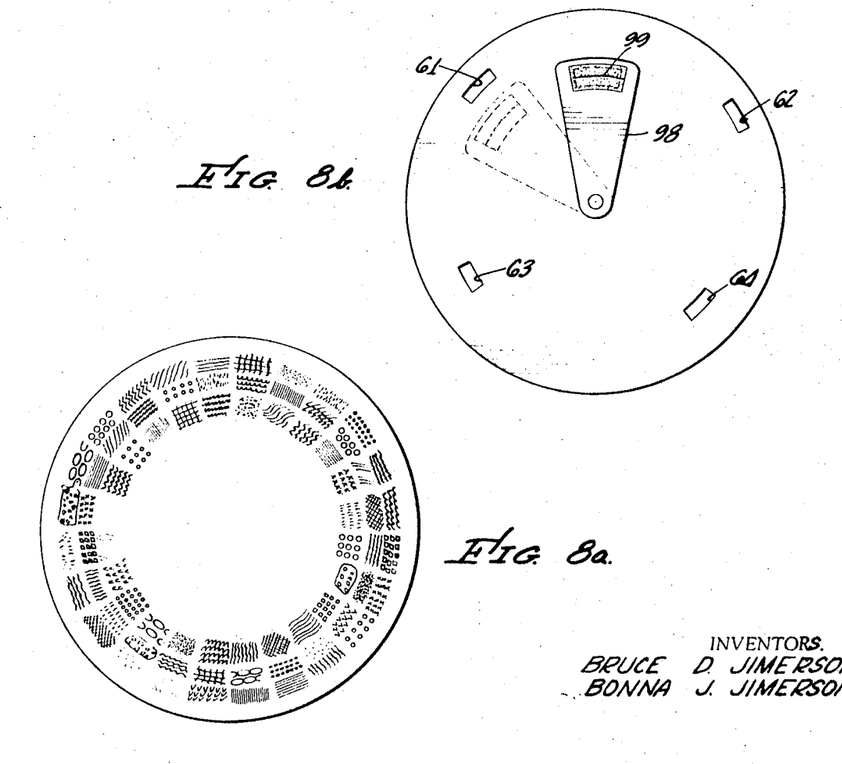
FIG. 8a shows a disc having impressed thereon a variety of textures which the children try to identify using the sense of sight and touch.
FIG. 8b shows how the cover plate 3 of the basic apparatus shown in FIG. 1 can be modified so as to hide the texture in question from the view of the players.

1. Lessons in spelling and word identification. Pictures appear in question window and a different word appears in each answer window. Child learns to spell simple nouns ("BALL," "CAT," "HOUSE," "CHERRY," etc.)
2. Lessons in basic arithmetic — Addition, subtraction, and simple 1st grade equations.
3. Lessons in texture (FIGS. 8a and 8b) A different texture appears in each of the four answer windows 61–64. The question window 60 is covered by rotatable flap 98 having a slotted sponge rubber cover 99 through which the child may poke his finger to feel the "question texture." Typically such textures as coarse and fine sandpaper, burlap, cordory, felt, plastic, rubber, etc. may be used. Children learn to coordinate the sense of feeling and sight.
4. Lessons in foreign language — Game discs are sold together with childrens records — child listens to record and learns to identify the foreign words by its sound. English equivalent appears in question box. Child is instructed by the record where to turn the wheel to start the lesson and when to turn the wheel to the next question. On the first part of the record the child is told where the answer is and how to pronounce the foreign word. On the second part of the record - the child is told only when to turn the wheel and how to pronounce the foregin word — but is not told in which window 61–64 the answer appears.
5. Spelling taught by Braille. Letters and words are embossed on question band of disc. Child uses flap 98 to cover window 60 and feels through sponge rubber 99 to identify which of the four answer words corresponds to the imbrailled question word. Child learns to spell and identify word using two senses, (sight and touch). Because information received by these senses is stored in different ways in the brain, retentivity is improved.

6. Lessons in reading concentration — FIGS. 9a and 9b. Letters, numbers or words are written on a backing disk 100 and random lines are drawn on two transparent disks 101 and 102. The three discs 100–102 are held together by a single rivit 103 so that each can be rotated with respect to the other. One of the answers (on disk 100) is identical with what shows in the question box (on disk 100) — but because of the lines on discs 101 and 102 both the answers and questions are partially obscured. Children learn to concentrate by finding the one obscured word in the answer windows 61–64 that is identical with the obscured word in the question window 60. Such lessons are valuable as aids in teaching reading, particularly for those children who are apt to lose their place (and have difficulty finding it again) when they get stuck on a word. The child develops the ability to find and identify words. Because the two top discs can be rotated relative to the question and answer disc 100, the number of possible variations is unlimited.

7. Lessons in reasoning — I.Q. type questions. The question window for example, may show a set of blocks which may appear differently when viewed from different angles. One of the answer windows shows a correct representation of the blocks when viewed from a different position. Another example might be "one of these is not like the other" game in which the question window is not used — instead the answer window shows four items (one of which is different than the other three). Thus, the letters A, F and J may appear in the windows 61, 62 and 63 and the number 7 may show in window 64.

8. Colors and mixing colors. For example two colors may show in the question window and the color which results when these two are combined will show in one of the answer windows.

9. Lessons in 3-dimension. Discs may also mount 3-dimensional objects such as small screws, nuts, washers, pennies, etc. Child attempts by feeling to identify the question object hidden under the flap 98 as one of the four objects which appear in the answer windows.

Figures 9A, 9B, 10A, 10B:
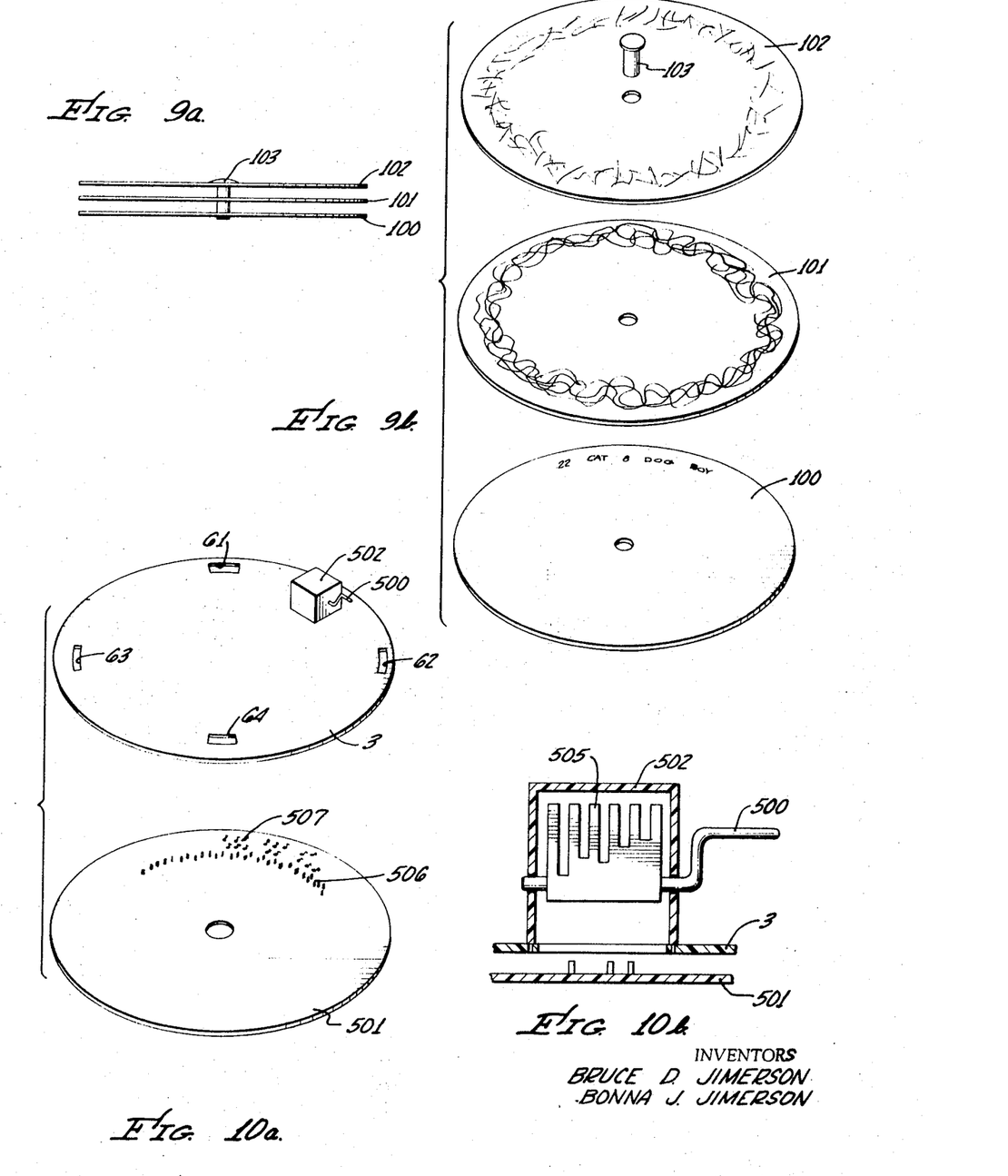
FIGS. 9a and 9b show the construction of a composite disc having 2 transparent sheets which are randomly marked to obscure printed words, letters and numbers.
FIG. 10a shows how a musical apparatus can be added to the structure of FIG. 1 so that it can be used to teach music reading.
FIG. 10b shows the structure of the musical apparatus.

10. Musical reading and identification. FIGS. 10a and 10b show how a hand cranked music box 502 can be snapped over the question window 60. The game disc 501 is structured so as to have a series of protruding strikers 506 which contact the tones 505 in the music box when the crank 500 is rotated. The arrangement of strikers 506 determines the tones and their sequence for each position of the wheel 1; but the first note is always middle C to give the listener a standard reference. One of the musical scores 507 which appears in one of the answer windows 61–64 corresponds to the notes which are heard when the crank 500 is rotated clckwise. Children thus learn to identify a certain melody or tone sequence with its visual counterpart, i.e., the musical score.

Most all of the parts can be made of plastic. The wheel 1, for example, including all of the trays 46, slots 10–15, registration holes 56, index pins 70 and 71 and center bearing hole 45 can be formed by a single extrusion. The same is true for the cover 2 and access plate 3. Objects such as wishing wells, treasure chests and the like may be attached to the trap doors so that children in effect "look under the object" to find their reward.

A physical size of approximately 14 × 16 inches is quite satisfactory.

As previously mentioned, the game can be played by one or more children. If used in a solitary fashion the child simply opens the door (without removing the reward). In this case the child learns from having to find the correct answer to open the door. If the optional bell, light, or buzzer is used — the sound or light will produce the requistie signal for indicating a correct answer. If the game is played competitively — by two or more children, each child takes a turn and if one child tries the wrong push rod the other child gets a chance to answer the question by pressing one of the remaining three push rods. The game may continue with each child saving his or her coins (or other rewards) which are counted after all the questions on a disc have been answered to determine the winner.

Figure 11:
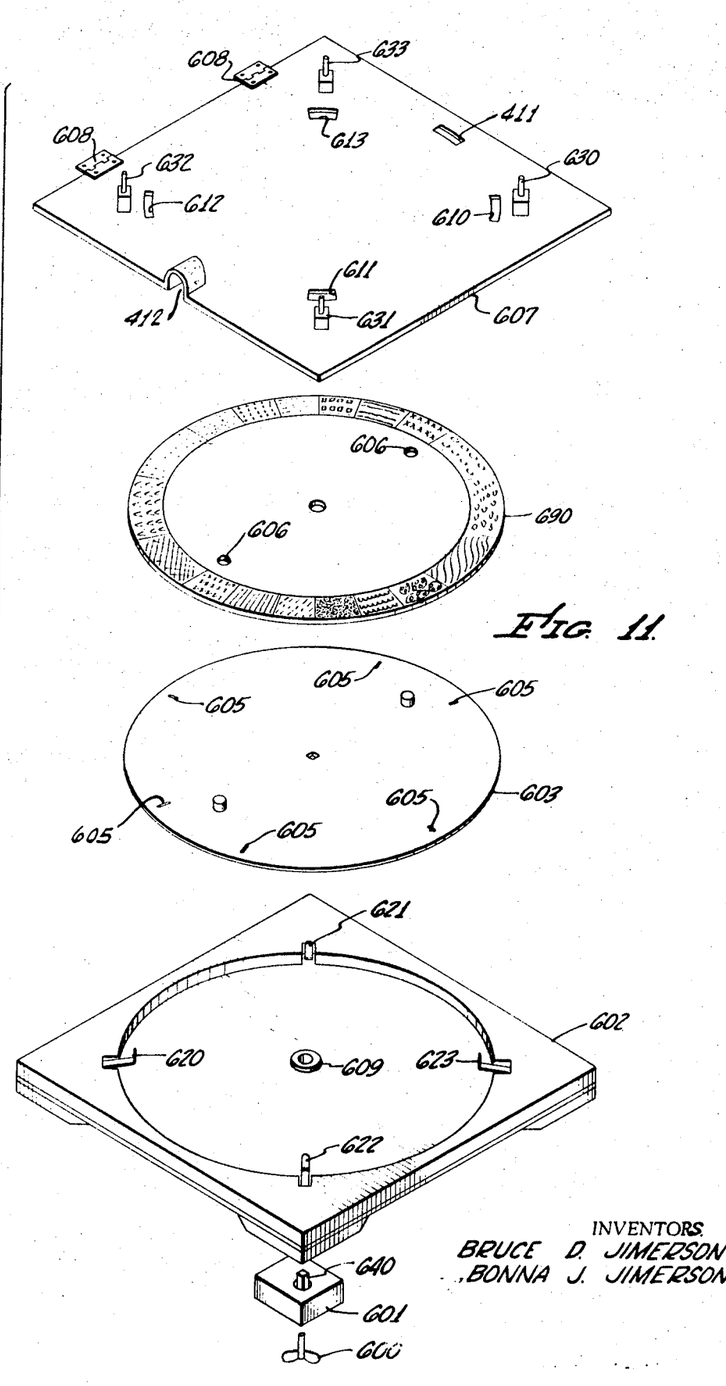
FIG. 11 is an exploded perspective view of a preferred embodiment utilizing the release of the wheel as a reward for the correct answer.

FIG. 11 shows another embodiment of the invention comprising a spring wound musical movement 601 which is attached to the under side of a base frame 602; a coded wheel 603 which is square keyed to the shaft 640 of the musical movement 601; interchangeable game discs 690 (having visual, audio, textural or Braille type questions and answers) which are adapted (via holes 606) to mount on the wheel 603, and a hinged top cover 607 having four answer windows 610–613, a visual question window 411 and a question cave 412. The base frame 602 has four spring biased registration pins 620–623 which are located on the same radius as the registration holes 605 of the coded wheel. When the spring of the musical movement is wound (key 600) the wheel 603 is caused to rotate until one of the registration pins (620–623) snaps into one of the registration holes 605. The game discs 690 are constructed so that the correct answer to the question will appear in the window adjacent to that push rod (630–633) which, when depressed, will free the registration pin (620–623) which is restraining the wheel 603. The six holes 605 are coded in a manner similar to that shown in FIGS. 2a – 2g so that only one of the registration pins 620–623 will be aligned with one of the holes 605 at any given time. When the proper push rod is depressed, the child is thus rewarded by having the wheel 603 slowly rotate until it is stopped by a different registration pin (620–623) snapping into one of the holes 605. At this point another question is presented either in the visual window 411 of the feeling cave 412 depending upon what game disc 690 the player is using.

Figure 1:
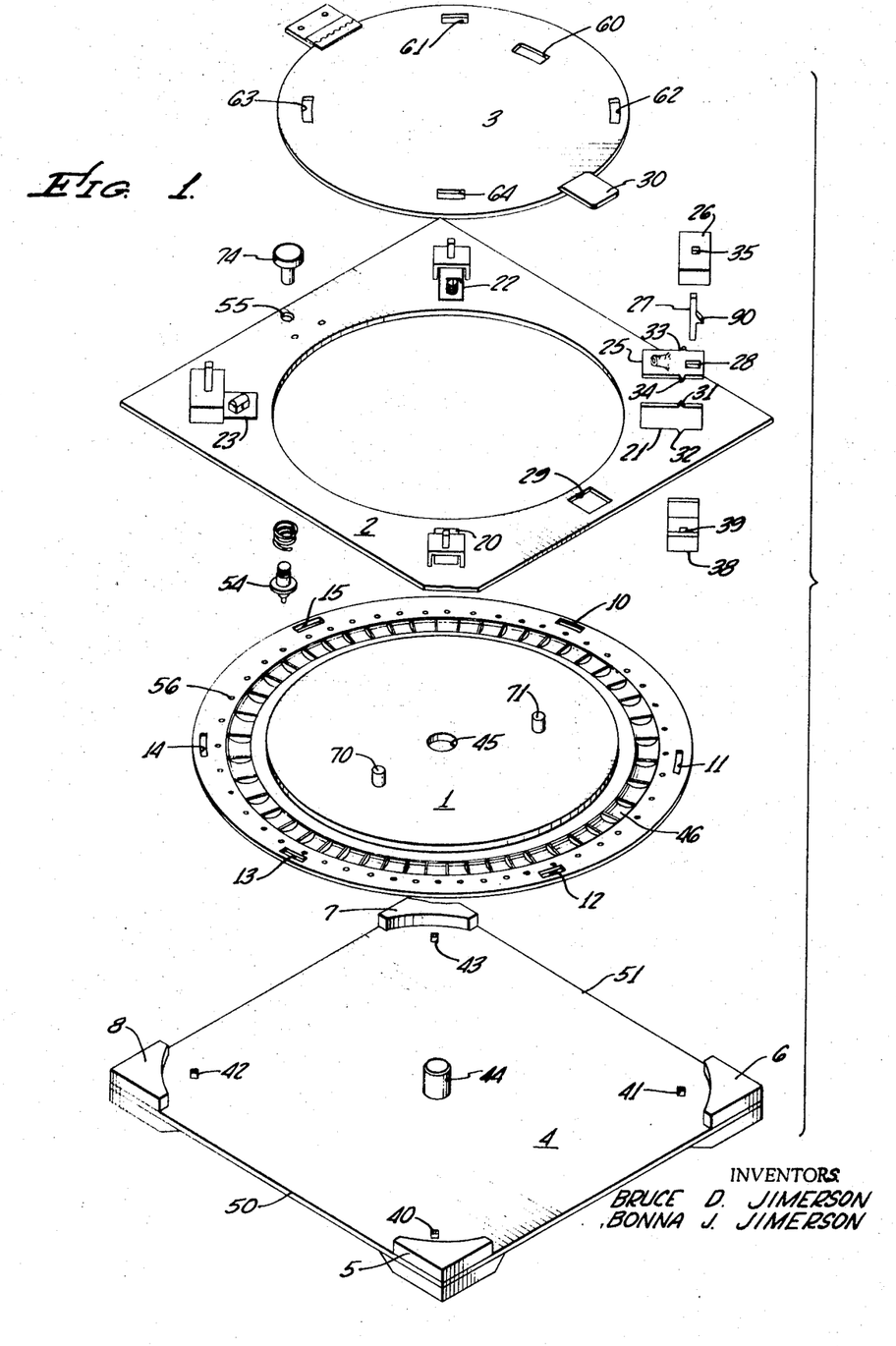
FIG. 1 is an exploded perspective view showing the operative features of a preferred embodiment of the invention utilizing trap door rewards.
Figure 17A:
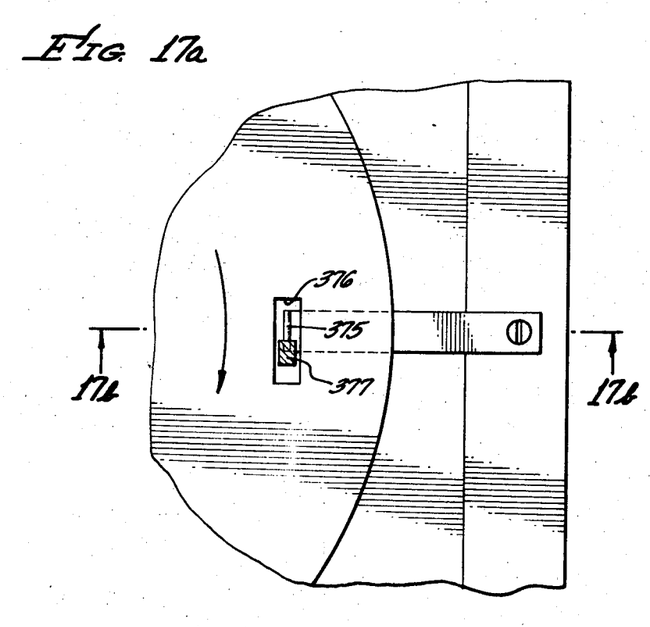
FIGS. 17a and 17b show an arrangement for utilizing the award concept illustrated in FIG. 1 in combination with a spring powered wheel.
Figure 17B:
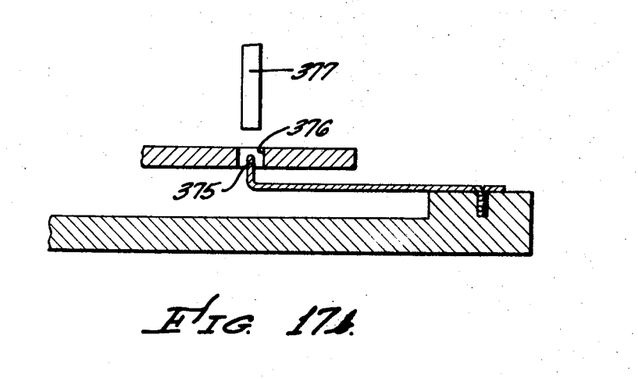

The embodiment shown in FIG. 11 has certain advantages over that shown in FIG. 1. The child does not have to move the wheel to a new question — this happens automatically when he finds the right answer. As a bonus he gets a short 4 or 5 seconds of musical entertainment. One feature which the emodiment shown in FIG. 11 does not have is that of automatic score keeping (i.e., rewards are not collected.) This feature can be added however. For example, if the registration pin 54 is deleted the wheel 1 shown in FIG. 1 could be rotated by a spring powered musical movement and the push rods 27 could be arranged so as to disengage the wheel from spring biased pins similar to 620–623. Such an arrangement is shown in FIGS. 17a and 17b. When the push rod 377 is depressed it enters the slot 376 ejecting the spring biased pin 375. The wheel advances slightly because of the spring motor; at this point the pin 375 cannot re-enter slot 376 — and further rotation of the wheel is prevented by the push rod 377 within the slot 376. After the reward is removed and push rod 377 is released the wheel is free to rotate until some other pin engages a slot, etc.

Figure 12:
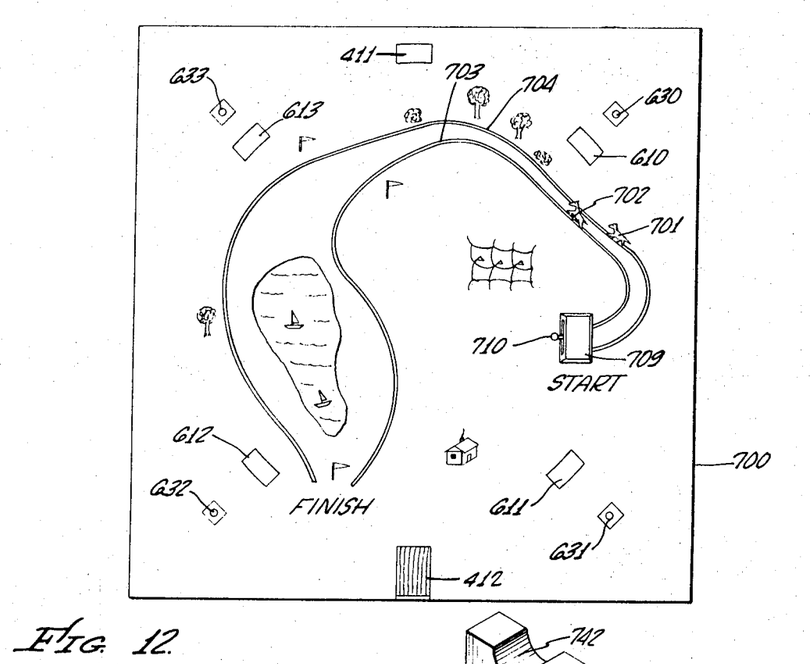
FIG. 12 shows how the hinged top cover of FIG. 11 can be modified to depict a playing board wherein the player who finds the correct answer is rewarded by having his representative object advance along the course of a raceway.
Figure 13:
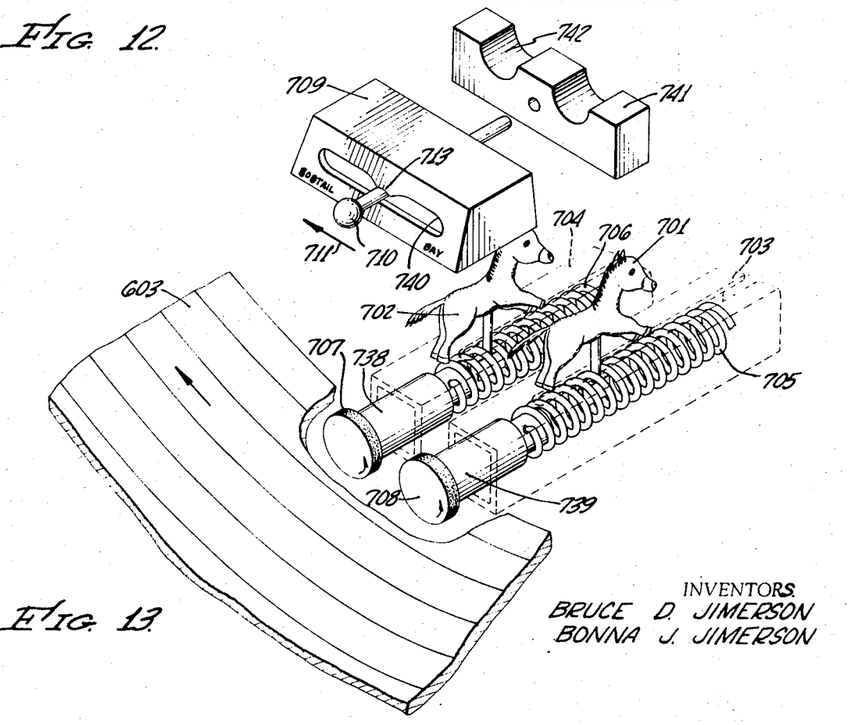
FIG. 13 shows the details of the raceways.

Another embodiment which provides a totalling of correct answers is shown in FIG. 12. Here the hinged top cover 700 is designed to depict a country Fairground having a race course upon which two or more representative objects (e.g., miniature horses, autos, etc.) are moved according to which player discovers the correct answer. The race mechanism omprises a pair of slotted guideways (703–704) each containing a spiral spring (705–706), one of the springs being caused to rotate according to which friction wheel (707 or 708) is in contact with the coded wheel 603 when the latter is released. The housing 709 has a slide button 710 which the players move to allow one of the friction wheels (707 or 708) to make contact with the unused surface of a game disc (i.e., a portion where there is neither an answer or question track). Assuming for example, that the slide button is moved to the left in the direction of the arrow 711 (to the Bobtail nag position). The Bobtail nag (object 701) will be advanced along the raceway 703 when the wheel 603 rotates — the recess 713 functioning to allow the shaft 738 to drop so that the friction wheel 707 contacts surface 603. When the slide button 710 is to the left, shaft 739 is held upward by the raised portion 740 of the slide mechanism.

In order to play the game competitively, the players take turns answering questions. The first player for example, may be the Bobtail nag — when it is his turn he moves the slide button 710 to the left (arrow 711) and then depresses that push rod (630–633) which is bearest to the window which he believes is the correct answer to the question (presented either in the visual window 411 or beneath the cave 412 depending upon the game being played). If he is correct, the push rod will disengage the registration pin (620–623) which is holding the wheel 603 allowing it to rotate to the next question. When the wheel 603 rotates, the spring 705 will rotate and the horse 701 will advance along the raceway 703 — with the music box playing some appropriate tune such as "Camptown Races." If the first player picks the wrong answer, the second player has a chance at the same question. The second player moves the slide button 710 to the right and tries the push rod which he thinks is correct. If the second player gets the correct answer, the "Bay" 702 will advance when the wheel rotates and so forth — with the player whose horse first reaches the finish line being declared the winner. Good players can of course, give smaller children a headstart handicap of several inches. Children can also play the game in a solitaire fashion with one horse representing the player and the other horse an imaginary opponent. Each time the player misses a question he moves the slide button 710 so that the imaginary opponent's horse will advance, with the remaining answers tried until the correct answer is found. The slide button is then returned for the next question and so forth. If the player gets 50 percent of answers correct he will win the game. After most of the answers have been learned the player can give the imaginary opponent a handicap.

Figures 14, 15, 16:
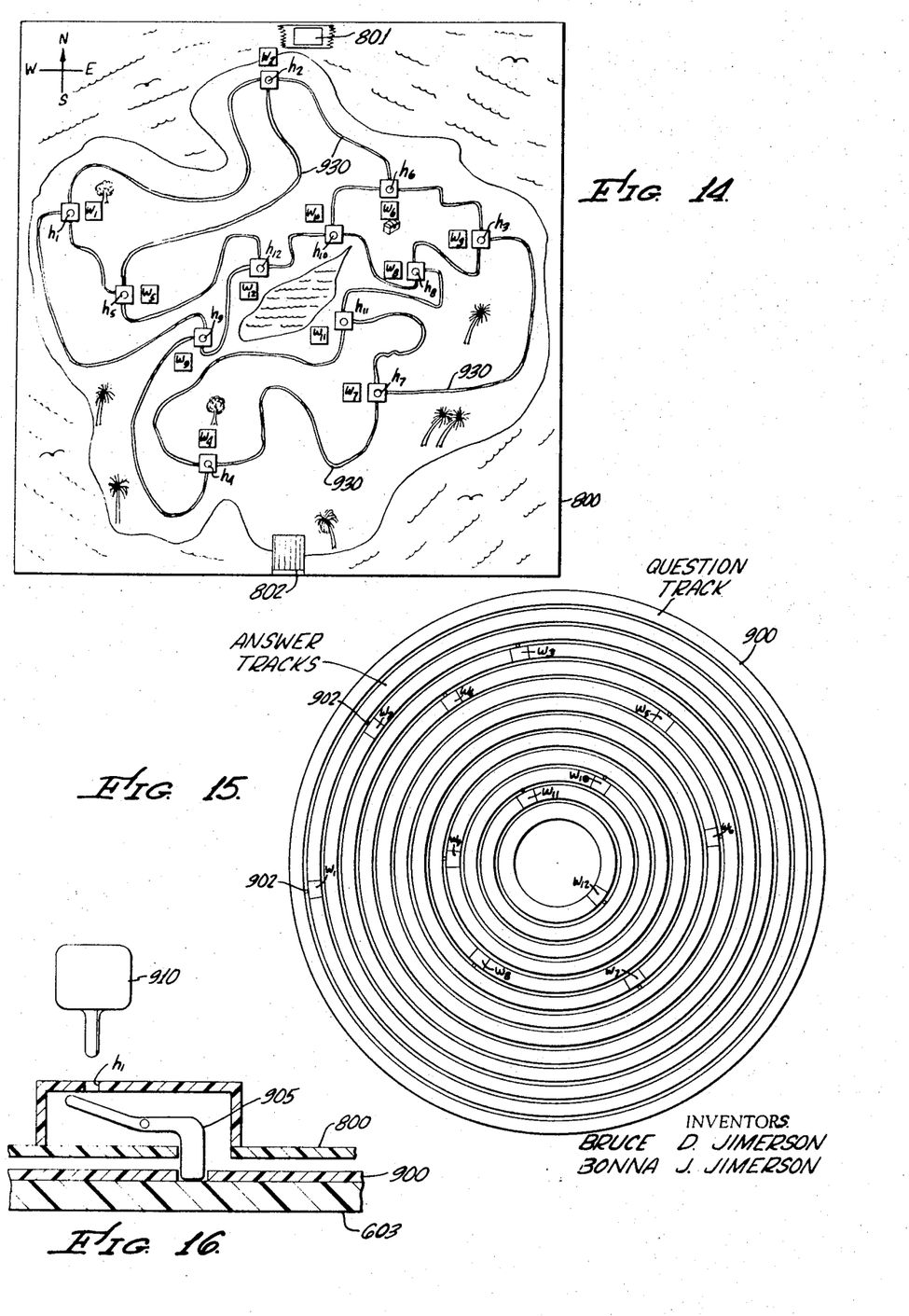
FIG. 14 shows an embodiment where the top cover is designed to depict a treasure island.
FIG. 15 shows how the game discs for the Treasure Island embodiment are structured.
FIG. 16 shows how a registration pin disengages the wheel when a player inserts his peg in the correct answer hole.

FIG. 14 shows another embodiment of the invention where the top cover 800 depicts a treasure island having colorful rocks, lakes, trees, foliage and sandy beaches — all surrounded by a blue green ocean. There are two question windows — a visual one 801 and a slotted opening 802 underneath the cave. The game discs 900 have twelve separate answer tracks and an outer question track as shown in FIG. 15. Each answer track is on a different radius — which corresponds to the radial position of one of the answer windows $W_1$ – $W_{12}$. The question and answer tracks may be embossed letters or numbers, texture materials, visual or musical information, etc. Each track is separated from the next adjacent track by a smooth band 90 which has one registration hole 902. These holes 902 are located so that they will "line-up" with the registration pin adjacent to the window where the correct answer to the question is displayed, The registration pins 905 are heavier at one end (shown in FIG. 16) so that they will fall into the registration holes 902 so as to stop the discs 900 and hence the wheel 603, the latter being driven by a spring wound musical movement mounted on a base similar to that shown in FIG. 11.

In order to enhance the game excitement, the various game discs 900 can be designed so that the windows (other than the one which shows the correct answer) display things other than wrong answers. Thus, some of the windows may show a background similar to the board design at that point — and the players need not consider twelve different answers. A game which provides considerable playing fun is one in which, for each question, there appears in one window a tiger and in another window a pirate, and in a third window a cannibal. These three bad characters move to an adjcent window (one connected by a path) each time the wheel 603 moves to a new question position. These bad characters however, do not appear next in that window where the correct answer is.

To play the game, the players take turns moving a colored peg 910 from one adjacent peg hole ($H_1$ – $H_{12}$) to another (following the connecting paths). The player who first lands in the correct peg hole with his peg will trip the registration pin 905 releasing the wheel 603. Other players — who are within one move of a window showing a bad character are likely to have that character catch them (by appearing in the window adjacent to their peg). If this happens, that player is penalized (for example by being put out of the game — or in having to forfeit some game token, etc.). Since the players known only that bad characters can travel one step at a time along the permissible paths 930 marked on the board (the same as the players) and that the correct answer is a safe position — there is both excitement and strategy in moving about the board to find the correct answer first.

The basic concept of the invention is of course, not limited to the particular games and structures illustrated. Thus, although preferred embodiments have been shown and described it will be understood that the invention is not limited thereto — and that numerous changes, modifications and substitutions may be made without departing from the spirit of the invention.

We claim:
1. An Educational Game Toy comprising:
a first surface having a plurality of openings;
a second surface beneath said first surface and parallel to said first surface and moveable in a plane parallel to said first surface;
at least one information surface having question information and answer information which includes at least one correct answer, said question and an- swer information to be encoded to correspond with the openings in said first surface;

means for attaching said (third) information surface to said second surface whereby the information relative to the openings in said first surface will be changed when said second surface is moved;

means for retaining said second surface in a fixed position relative to said first surface whereby the question and answer information encoded on said information surface may be analyzed through the openings in said first surface prior to the selection of an answer;

means for selecting one among a plurality of the answers to question information presented through the openings in said first surface;

means for rewarding the selection of a correct answer and means for moving said second surface from one position to another whereby each question presented on said information surface may be examined in sequence.

2. The game toy recited in claim 1 wherein said second surface is a rotatable wheel and wherein said means for selecting one among a plurality of answers comprises:

an actuator associated with each of the openings in said first surface which relates answer information, and means for responsively connecting said means for rewarding the selection of a correct answer with said actuators whereby a reward is produced by operation of the actuator associated with the correct answer.

3. The apparatus recited in claim 2 including at least one normally closed door in said first surface;

at least one tray on said rotatable wheel positioned to pass beneath said normally closed door;

means for opening said door to obtain access to said tray when said actuator is operated.

4. The apparatus recited in claim 2 including:

means for applying a torque to turn said rotatable wheel;

means for stopping said wheel at each question position so that the question information and the associated answer information encoded on said information surface is properly registered with respect to the openings in said first surface;

means for releasing said stopping means when the actuator associated with correct answer is operated whereby the wheel will automatically move to the next question position.

5. The apparatus recited in claim 4 wherein said means for rewarding the selection of a correct answer includes:

a race course;

at least one racing object and;

means for moving said racing object when said wheel rotates.

6. The apparatus recited in claim 2 wherein is included:

means for visually obscuring some of the information encoded on said information disk so as to allow the information so obscured to be felt but not seen.

7. The apparatus recited in claim 6 wherein said information disk is encoded so as to be sensitive to the touch.

8. The apparatus recited in claim 4 wherein said first surface comprises a playing board having a plurality of interconnected locations to which game pieces may be moved, and means for operating said actuators in accordance with the positions of said moveable game pieces.

* * * * *